United States Patent
Souppa et al.

(10) Patent No.: US 12,230,237 B2
(45) Date of Patent: Feb. 18, 2025

(54) TOUCH SCREEN INTERFACE FOR AUDIO SIGNAL PROCESSING IN AN ELECTRONIC MUSICAL-EFFECTS UNIT

(71) Applicants: John Alex Souppa, Ashland, MA (US); Walter P. Skorupski, Cranston, RI (US); John E. O'Donnell, Fort Lauderdale, FL (US)

(72) Inventors: John Alex Souppa, Ashland, MA (US); Walter P. Skorupski, Cranston, RI (US); John E. O'Donnell, Fort Lauderdale, FL (US); Grant R. Meacham, New York, NY (US)

(73) Assignee: inMusic Brands, Inc., Cumberland, RI (US)

( * ) Notice: Subject to any disclaimer, the term of this patent is extended or adjusted under 35 U.S.C. 154(b) by 0 days.

(21) Appl. No.: 16/963,351

(22) PCT Filed: Jan. 19, 2018

(86) PCT No.: PCT/US2018/014583
§ 371 (c)(1),
(2) Date: Jul. 20, 2020

(87) PCT Pub. No.: WO2019/143364
PCT Pub. Date: Jul. 25, 2019

(65) Prior Publication Data
US 2020/0365127 A1 Nov. 19, 2020

(51) Int. Cl.
*G06F 3/048* (2013.01)
*G06F 3/0488* (2022.01)
(Continued)

(52) U.S. Cl.
CPC ......... *G10H 1/0091* (2013.01); *G06F 3/0488* (2013.01); *G10H 1/342* (2013.01);
(Continued)

(58) Field of Classification Search
CPC .. G06F 3/0488; G10H 1/18; G10H 2220/096; G10H 1/0091; G10H 1/342
See application file for complete search history.

(56) References Cited

U.S. PATENT DOCUMENTS 7,304,232 B1 * 12/2007 Nicholes ............... G10H 3/182
84/741
2007/0240080 A1 * 10/2007 Eldridge ............... G06F 3/0486
717/113
(Continued)

FOREIGN PATENT DOCUMENTS

WO 2019143364 A1 7/2019

OTHER PUBLICATIONS

"Headrush Pedalboard User Guide", version 1.2.1, Apr. 26, 2017, pp. 4, 7, 8, 13, & 14 (Year: 2017).*
(Continued)

*Primary Examiner* — Claudia Dragoescu
(74) *Attorney, Agent, or Firm* — ARENTFOX SCHIFF LLP

(57) ABSTRACT

A guitar multi-effects pedalboard is provided. The pedalboard has one or more footswitches, an electronic display, and a memory storing guitar-effect presets for processing an inputted guitar signal when the processing is triggered by pressing a footswitch. The presets include signal chains with two or more guitar-effect pedal simulators that simulate two or more guitar-effect pedals. The pedalboard also has one or more processors coupled to the electronic display and the memory. The processors are configured to process an inputted guitar signal when the processing is triggered by pressing a footswitch. The processors are also configured to display, on the electronic display, an image of the signal chains, which includes an image of pedals and an image of existing simulated connections between pedals. Signal rout-
(Continued)

ing in the signal chain may be changed by touching the image of a pedal and dragging the image to a destination position.

20 Claims, 6 Drawing Sheets

(51) Int. Cl.
    *G10H 1/00*     (2006.01)
    *G10H 1/34*     (2006.01)
    *G10H 3/18*     (2006.01)

(52) U.S. Cl.
    CPC ....... *G10H 3/186* (2013.01); *G10H 2210/155* (2013.01); *G10H 2220/096* (2013.01)

(56) References Cited

U.S. PATENT DOCUMENTS

| | | |
|---|---|---|
| 2013/0327201 A1 | 12/2013 | Urry et al. |
| 2014/0132549 A1 | 5/2014 | Ludwig |
| 2014/0150630 A1* | 6/2014 | Juszkiewicz ............. G10H 1/44 |
| | | 84/626 |
| 2014/0325410 A1* | 10/2014 | Jung ..................... G06F 3/0488 |
| | | 715/765 |
| 2016/0299624 A1 | 10/2016 | Chen |
| 2017/0316766 A1* | 11/2017 | Perez ....................... G10H 1/18 |

OTHER PUBLICATIONS

International Preliminary Report on Patentability, International Application No. PCT/US18/14583 (8 pages).
International Search Report for International Application No. PCT/US2018/014583, 2 pages (mailed Apr. 5, 2018).
Written Opinion for International Application No. PCT/US2018/014583, 7 pages (mailed Apr. 5, 2018).
Line 6 "Helix LT Owner's Manual", Article [online]. Apr. 18, 2017 [retreived on Mar. 20, 2018]. Retreived from Internet: <URL: https://line6.com/data/6/0a020a3e07b158e5548ea50d4/application/pdf/Helix%2OLT%20Owners%20Manual%20-%20English%20.pdf> p. 19.
Headrush "Headrush Pedalboard User Guide", Article [online]. Apr. 26, 2017 [retreived on Mar. 19, 2018]. Retreived from Internet: <URL: http://www.headrushfx.com/assets/Pedalboard-UserGuide-v1.2.1.pdf> pp. 4, 7, 8, 13, & 14.

* cited by examiner

TOUCH SCREEN INTERFACE FOR AUDIO SIGNAL PROCESSING IN AN ELECTRONIC MUSICAL-EFFECTS UNIT

CROSS-REFERENCE TO RELATED APPLICATIONS

This application is a national stage entry of PCT Application No. PCT/US2018/014583, which was filed on Jan. 19, 2018. This application claims priority to PCT Application No. PCT/US2018/014583. The contents of PCT Application No. PCT/US2018/014583 is incorporated herein by reference in its entirety for all purposes.

TECHNICAL FIELD

The present disclosure relates generally to a touch screen interface for audio signal processing in an electronic musical-effects unit.

BACKGROUND

Electric guitarists and electric bass-guitar players can use one or more guitar effects while playing an electric guitar or electric bass guitar. Such effects receive a signal outputted by one or more variable-reluctance sensors on the guitar (e.g., guitar pickups) and modify it to alter its sonic characteristics. Examples of such effects include distortion, compressor, chorus, and delay. A discrete pedal may provide a single effect. Guitarists can use a plurality of discrete pedals connected in series and/or parallel with multiple electrical cables such that each pedal imparts a particular guitar effect onto the signal. For example, one discrete pedal may provide a distortion effect, another discrete pedal may provide a compression effect, etc. A discrete pedal may have a footswitch and may be activated or deactivated by pressing the footswitch. For example, guitarists may activate or deactivate a distortion pedal depending on the whether they desire their guitar tone to be distorted. Guitarists may use their feet to press the footswitch in order to simultaneously play with their hands. To facilitate pressing the footswitch with the guitarists' feet, the discrete pedals may be placed on the ground. A discrete pedal may be designed with a unique appearance so as to differ from other discrete pedals. This allows guitarists to quickly distinguish between different pedals while playing on the stage. This may be helpful, for example, when playing in environments with unusual or suboptimal lighting conditions (e.g., clubs, bars, concert halls, etc.).

Because a discrete pedal may provide a single effect, guitarists may desire having multiple discrete pedals. But using multiple discrete pedals has disadvantages. Traveling with or otherwise moving multiple discrete pedals may be cumbersome for guitarists. Moving multiple pedals may involve disconnecting each pedal, packing each pedal, packing each pedal's power supply, keeping track of which power supply is associated with which pedal, relocating the multiple pedals, and/or reconnecting the pedal signal chain. Another disadvantage of having multiple discrete pedals is the large number of steps that may be required to change a guitarist's tone. For example, guitarists may need to select and deselect many effects to get their desired tone for a forthcoming musical piece. These steps may need to be performed quickly (e.g., while an audience waits between songs). Some steps may require turning knobs on one or more pedals, which could be time consuming and require guitarists to kneel down while holding their guitar. Yet another disadvantage of having multiple discrete pedals is the time required for reconfiguring the signal chain. For example, it may take a long time to insert a pedal into a proper location in the signal chain because of the time required to determine how the existing configuration is connected and to physically make the proper connections.

The disclosed systems and methods are directed to overcoming one or more of the problems set forth above and/or other problems or shortcomings in the prior art.

BRIEF DESCRIPTION OF THE DRAWINGS

The accompanying drawings, which are incorporated into and constitute a part of this specification, illustrate the disclosed embodiments and, together with the description, serve to explain the principles of the various aspects of the disclosed embodiments. In the drawings.

Figure 1:
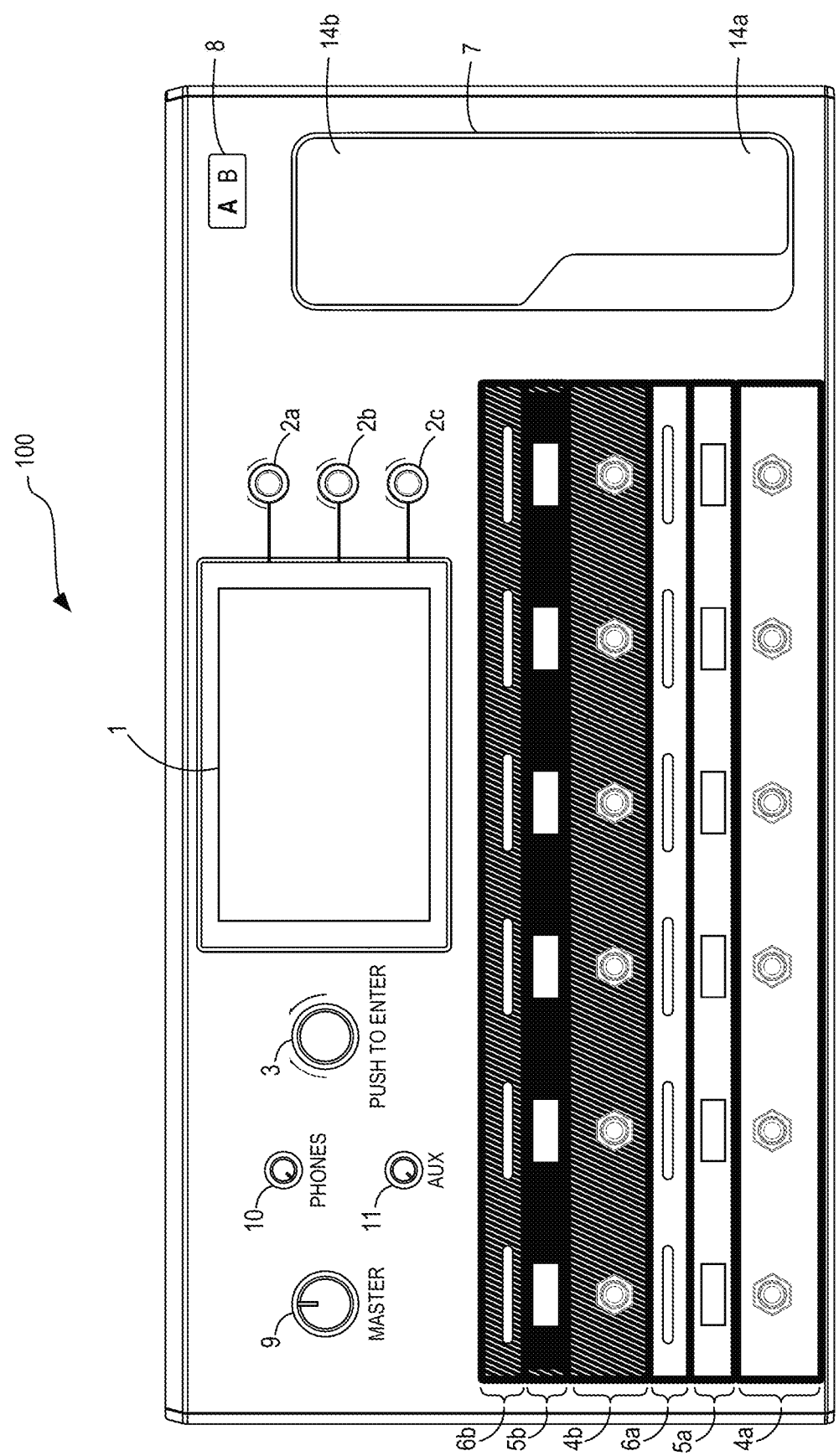
FIG. 1 illustrates a top view of an exemplary multi-effects unit.

It is to be understood that both the foregoing general descriptions and the following detailed descriptions are exemplary and explanatory only and are not restrictive of the claims.

DESCRIPTION OF EXEMPLARY EMBODIMENTS

Reference will now be made to certain embodiments consistent with the present disclosure, examples of which are illustrated in the accompanying drawings. Wherever possible, the same reference numbers will be used throughout the drawings to refer to same or like parts.

The present disclosure describes a touch screen interface for audio signal processing in an electronic musical-effects unit.

To avoid some of the above shortcomings of discrete pedals, guitarists may use an integrated multi-effects unit. A multi-effects unit provides a plurality of effects. A multi-effects unit may be thought of as a single unit that integrates multiple discrete pedals into one. A multi-effects unit may have one or more footswitches. A multi-effects unit may be easier to move than multiple discrete pedals because a multi-effects unit may provide a plurality of effects within a single housing. Multiple effects on a multi-effects unit can be activated and/or deactivated with, for example, a single press of a footswitch thereon. Parameters that would need to be modified with knobs on discrete pedals may be modified with, for example, a single press of a footswitch on a multi-effects unit.

Integrated multi-effects units may modify guitarists' signals using digital signal processing. Guitarists' desired effects, signal chain, and parameters are stored in computer-readable non-transitory memory. A particular combination of effects, the corresponding signal chain of the effects, and the parameters for the effects may be referred to as "a preset." As discussed above, a preset may be recalled with, for example, a single press of a footswitch; however, retrieving a preset from memory and providing the necessary data to a digital signal processor takes time. During this time, an audible gap may be introduced into the audio signal outputted by a multi-effects unit. This audible gap may be undesirable to a guitarist seeking to continuously play while changing the effects, signal chain, and/or parameters used by the multi-effects unit (e.g., by changing the preset).

A multi-effects unit may comprise a display to provide guitarists with information pertaining to effects, the signal chain, and/or parameters. Conventional displays, however, may not provide a guitarist with sufficient information about the effects, the signal chain, or parameters. These displays may not provide a guitarist with information about the effects, the signal chain, or parameters in a manner that is quickly and easily discernable (e.g., during a high-energy performance in a poorly lit bar). For example, conventional displays may not allow a guitarist to quickly and easily tell apart two effects and determine which footswitch controls a particular effect. These displays may not provide a guitarist with information needed to modify which effects are selected, the signal chain, or parameters quickly and easily. These deficiencies may be especially inconvenient when the display is a substantial distance from the guitarist's eyes (e.g., on the floor while a guitarist is standing).

FIG. 1 shows one illustrative embodiment of a multi-effects unit generally at 100. Multi-effects unit 100 includes a display 1. Display 1 may show information relevant to multi-effects unit's 100 current operating state. Display 1 is a full-color display. Display 1 is a touchscreen display, such as a multi-touch display. Display 1 and/or other hardware controls are used to control multi-effects unit 100.

Other hardware controls such as encoders, footswitches, pedals, knobs, or buttons may be used to make selections from display 1. Parameter knobs 2a, 2b, and 2c are rotated to adjust parameters or settings shown on display 1. As discussed below with respect to FIG. 4, one or more of parameter knobs 2a, 2b, or 2c are rotated to adjust one or more parameters 438a, 438b, and 438c displayed near one or more of the knobs. For example, knob 2a may adjust parameter 438a, knob 2b may adjust parameter 438b, and knob 2c may adjust parameter 438c.

Rotary encoder 3 is rotated to scroll through displayed menu options on display 1 and/or adjust selected parameter values. Rotary encoder 3 is pushed to confirm a selection.

Footswitches 4a, 4b may be pressed to activate or deactivate a discrete simulated effect pedal. Footswitches 4a, 4b may be pressed to load a preset, activate a tuner, change the view displayed on display 1 or other displays (discussed below), and/or change a tempo associated with a preset.

Expression pedal 7 may be used to adjust one or more parameters, as discussed below with respect to FIG. 4. Expression pedal 7 may have a bottom portion 14a and a top portion 14b. One or more expression-pedal light-emitting diodes 8 provide information relevant to the operation of expression pedal 7. While a single expression pedal 7 is shown, it is to be understood that multi-effects unit 100 may comprise no expression pedals, a single expression pedal, or multiple expression pedals.

Multi-effects unit 100 comprises one or more knobs. A master-volume knob 9 is rotated to adjust the volume of the sound signal outputted through one or more outputs of multi-effects unit 100, discussed below with respect to FIG. 2. For example, master-volume knob 9 is rotated to adjust the volume of the sound signal outputted through main outputs. A headphones-volume knob 10 is rotated to adjust the volume of the sound signal outputted through a headphones output. An auxiliary-volume knob 11 is rotated to adjust the volume of a sound signal received at an auxiliary input.

Multi-effects unit 100 may have displays and/or indicators instead or in addition to display 1. Footswitch displays 5a and 5b are shown positioned above footswitches 4a and 4b, respectively. Footswitch displays 5a show information relevant to the operation of footswitches 4a and footswitch displays 5b show information relevant to the operation of footswitches 4b. For example, one of footswitch displays 5a positioned near (e.g., above) one of footswitches 4a may display the name of a discrete effect pedal simulator associated with one of footswitches 4a. In some embodiments, pressing one of footswitches 4a may activate or deactivate the discrete effect pedal with the name displayed on one of footswitch displays 5a above the one of footswitches 4a. One of footswitch displays 5a for a specific one of footswitches 4a may have a color matching that of the pedal shown on display 1 that is activated and deactivated by the specific one of footswitches 4a. One or more of footswitch displays 5 may be an organic light-emitting diode display, a light-emitting diode display, or a liquid crystal display.

Footswitch indicators 6a and 6b provide information relevant to the operation of footswitches 4a and 4b, respectively, and/or, generally, multi-effects unit 100. For example, one of footswitch indicators 6a positioned near (e.g., above) one of footswitches 4a may be dimly lit or off to indicate that a discrete effect pedal simulator associated with the one of footswitches 4a is disabled. The one of footswitch indicators 6a may be brightly lit or lit with another brightness to indicate that a discrete effect pedal simulator associated with the one of footswitches 4a is enabled. One or more of footswitch indicators 6a, 6b are light-emitting diodes.

Figure 2:
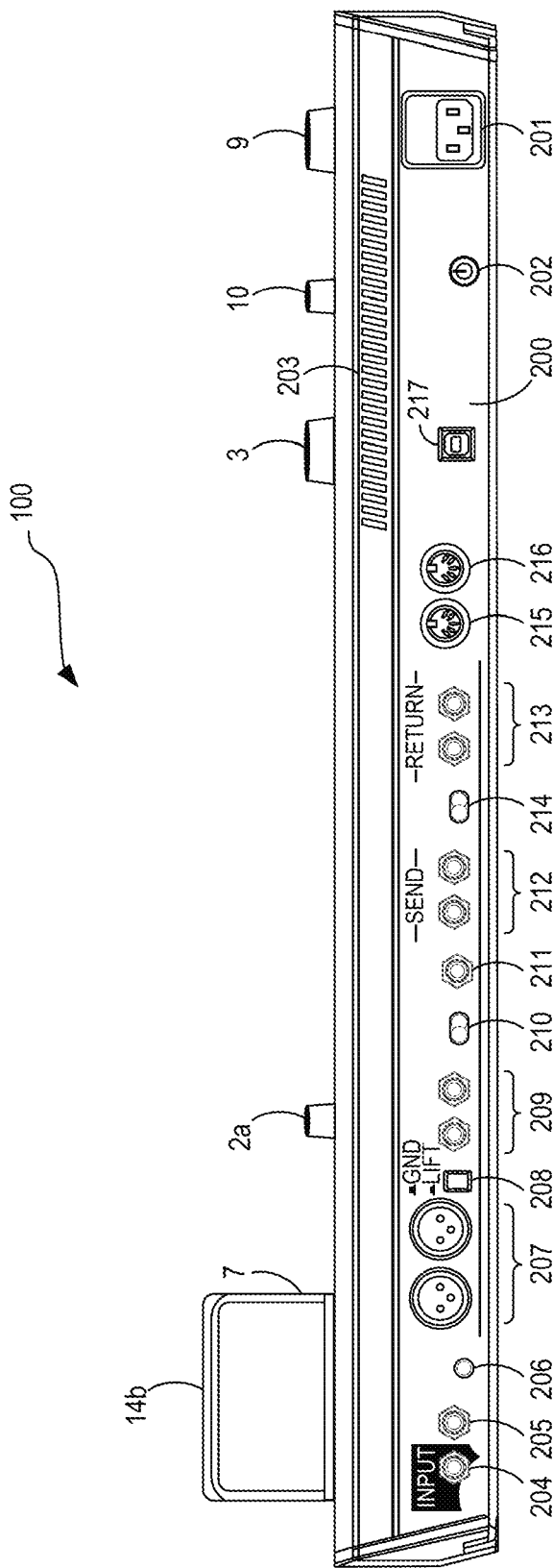
FIG. 2 illustrates a back view of an exemplary multi-effects unit.

Multi-effects unit 100 may have a rear panel 200. FIG. 2 shows one illustrative embodiment of a rear panel 200. Rear panel 200 comprises a power input socket 201 for connecting multi-effects unit 100 to a power outlet using a power cable. Rear panel 200 comprises a power switch 202 to power on and power off multi-effects unit 100. Rear panel 200 comprises a vent 203 for removing heat from within multi-effects unit 100.

Rear panel 200 comprises a guitar input jack 204 to which a guitar may be connected using, for example, a tip-sleeve ¼-inch cable. Rear panel 200 comprises a expression-pedal input jack 205, to which an expression pedal external to multi-effects unit 100 may be connected using, for example, a tip-ring-sleeve ¼-inch cable. Rear panel 200 comprises an auxiliary input jack 206, to which an audio source external to multi-effects unit 100 may be connected using, for example, a ⅛-inch stereo cable.

Rear panel 200 comprises XLR output jacks 207, which may be connected to an external audio system (e.g., active loudspeakers) using, for example, XLR cables. Rear panel 200 comprises a ground-lift switch 208, which may be depressed to disconnect the ground connectors within XLR output jacks 207 from ground pins in XLR cables connected to multi-effects unit 100. Doing so may eliminate humming noise audible in an external audio system connected to multi-effects unit 100. Rear panel 200 comprises ¼-inch output jacks 209 for connecting an external audio system (e.g., an audio interface) to multi-effects unit 100 using, for example, tip-ring-sleeve ¼-inch cables. Rear panel 200 comprises a output level selector 210 for selecting whether the output through ¼-inch output jacks 209 is at a guitar-amplifier level or at a line level. Multi-effects unit 100 comprises a ¼-inch headphones output jack 211 for connecting headphones to multi-effects unit 100.

Rear panel 200 comprises send output jacks 212 and return input jacks 213 for connecting an external audio-effect device to multi-effects unit 100 or for inserting multi-effects unit 100 to the send and return signal path of an external audio device (e.g., a guitar amplifier). Rear panel 200 comprises a rack/stomp selector 214 for selecting the level of the signal outputted from send output jacks 212 (e.g., a line level or a standard guitar-pedal output level).

Rear panel 200 comprises MIDI input jack 215 and MIDI output jack 216 for connecting external MIDI device(s) to multi-effects unit 100. Rear panel 200 comprises USB port 17 for connecting multi-effects unit 100 to a computer over a USB cable. USB port 17 may be used to send and/or receive digital audio signals, as well as import or export presets, amplifier model presets, and impulse response files (e.g., for simulating the sonic characteristics of guitar amplifiers, speakers, or speaker cabinets). USB port 17 may be used to update the firmware on multi-effects unit 100.

As discussed above, an audible gap may be introduced into the audio signal outputted by multi-effects unit 100 when retrieving a preset from memory and providing the data associated with a preset for a processor to process the guitar signal based on the preset. This audible gap may be undesirable to a guitarist seeking to continuously play while changing the effects, signal chain, and/or parameters used by multi-effects unit 100 (e.g., by changing the preset). This may be especially noticeable when switching from a preset that has delay or reverberation (i.e., "reverb") effects activated. These time-based effects extend the duration of an audio signal. Stopping the processing of an audio signal or portion thereof using a preset with these effects before the delayed or reverberated audio signal completes its decay below an audible threshold may be perceived by a listener as an undesirable and sudden cessation of sound and/or distortion.

In an exemplary embodiment, multi-effects unit 100 provides a tail feature by which a first portion of a guitar signal being processed based on parameters specified by a first preset continues to be processed after a second preset is selected for processing a second portion of the guitar signal. For example, a guitarist may select a first preset on multi-effects unit 100 and play a guitar part (e.g., a first portion of the guitar signal), select a second preset on multi-effects unit 100, and continue playing (e.g., generating the second portion of the guitar signal). If the tail feature is enabled, multi-effects unit 100 continues processing the first portion of the guitar signal using parameters specified by the first preset while simultaneously processing the second portion of the guitar signal using parameters specified by the second preset. The processed first portion and the processed second portion of the guitar signal may be simultaneously outputted. For example, if the first preset has a delay effect activated and the guitarist plays a first chord before switching to the second preset and playing a second chord, the delayed echoes of the first chord (e.g., the first portion of the guitar signal) are outputted together with the second chord (e.g., the second portion being processed based on the second preset)—even if the second preset has the delay effect deactivated. It is to be understood that the first portion of the inputted guitar signal does not have to be entire the portion of the inputted guitar signal received between selection of the first present and selection of the second present. The first portion of the inputted guitar signal may be a sub-portion of the inputted guitar signal received between selection of the first present and selection of the second present. Such sub-portion may be considered to be processed with the first preset in response to selection of the first preset (e.g., when the processing is triggered by pressing a footswitch 4a, 4b).

Figure 3:
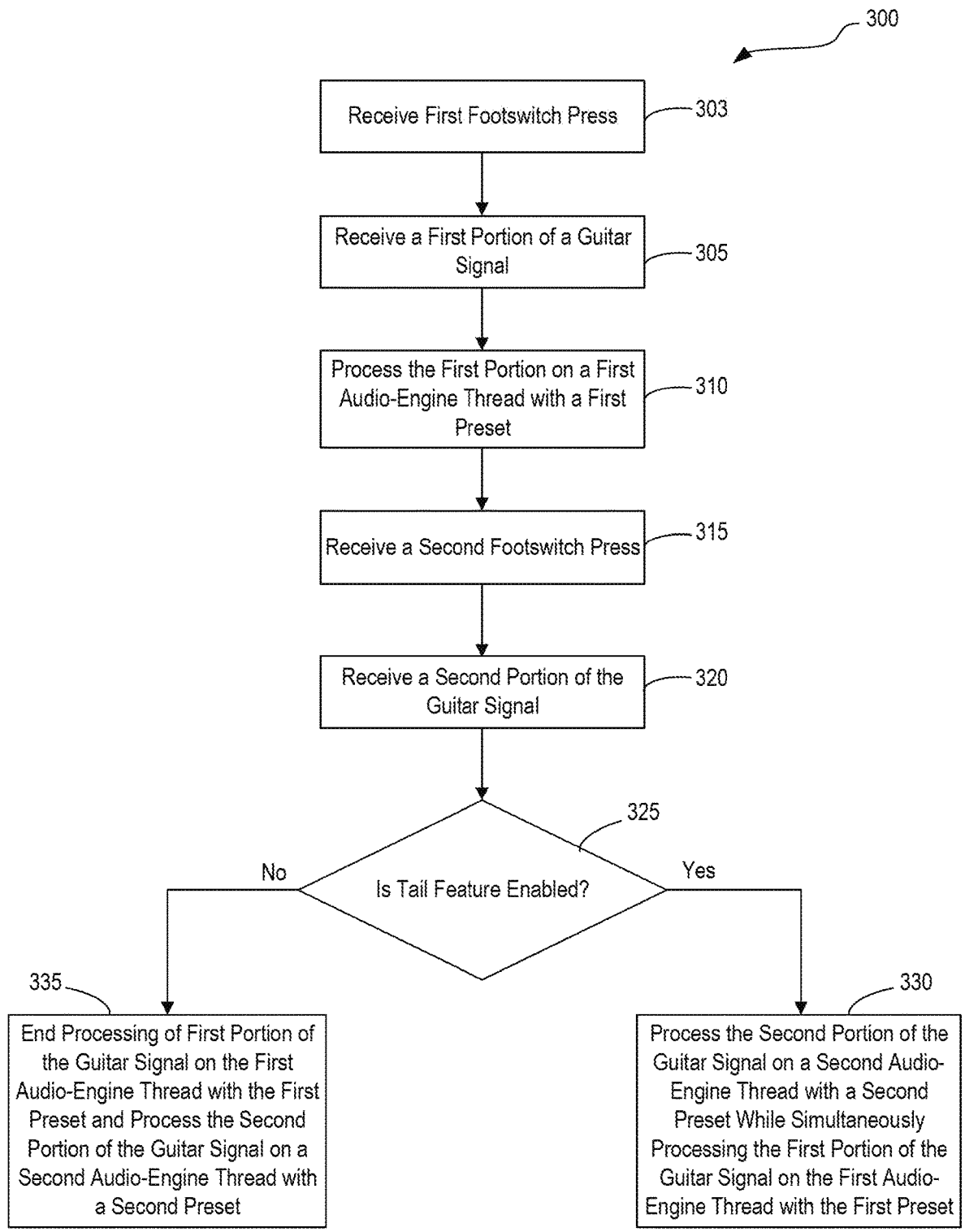
FIG. 3 illustrates an exemplary process for gapless audio preset switching.

In certain embodiments, the foregoing method may comprise an exemplary process 300 for implementing gapless audio preset switching illustrated in FIG. 3. Process 300 comprises multi-effects unit 100 receiving a first footswitch press (step 303). The first footswitch press is a guitarist's selection of a first preset on multi-effects unit 100. The guitarist plays a guitar connected to multi-effects unit 100. Multi-effects unit 100 receives this first portion of a guitar signal (step 305). Multi-effects unit 100 processes the first portion of the guitar signal using parameters specified by the first preset (step 310). Multi-effects unit 100 receives a second footswitch press (step 315). The second footswitch press is the guitarist's selection of a second preset on multi-effects unit 100. In some embodiments, multi-effects unit 100 may gradually decrease the amplitude of the first guitar signal being inputted into a processing component of multi-effects unit 100 in response to the guitarist's selection of the second preset. Doing so may prevent a sudden break in the first portion of the signal—being processed based on the first preset—thereby avoiding undesirable sonic distortion or an abrupt cutoff of the first portion of the signal being processed. The guitarist may continue playing the guitar connected to multi-effects unit 100. Multi-effects unit 100 may receive this second portion of the guitar signal (step 320). In certain embodiments, multi-effects unit 100 may gradually increase the amplitude of the second portion of the guitar signal—being inputted into a processing component of multi-effects unit 100—in response to the guitarist's selection of the second preset. Doing so may prevent a sudden spike in the second portion of the guitar signal—being processed based on the second preset—thereby avoiding undesirable sonic distortion or an undesirably fast attack in the second portion of the guitar signal's attack-decay-sustain-release envelope. In some embodiments, multi-effects unit 100 may gradually increase the amplitude of a signal being outputted from a processing component of multi-effects unit 100 or gradually increasing the amplitude of a signal derived from such outputted signal. Doing so may prevent undesirable sonic distortion or an abrupt spike in the outputted signal based on the second preset. Subsequent functionality of multi-effects unit 100 may be determined by whether the tail feature is enabled (step 325).

If the tail feature is enabled, multi-effects unit 100 may process the second portion of the guitar signal using parameters specified by the second preset on multi-effects unit 100 while simultaneously processing the first portion of the guitar signal using parameters specified by the first preset (step 330). This may be accomplished using, for example, multiprocessing and/or multithreading. In the case of multiprocessing, a first audio-engine thread associated with the first guitar preset and the first portion of the guitar signal may be run on a first core or on a first processor while a second audio-engine thread associated with the second guitar preset and the second portion of the guitar signal may be run on a second core or on a second processor. Instead or in addition to being run on two different cores or processors, the first audio-engine thread and the second audio-engine thread may be run on a single core located on a single processor. Examples of processors include, without limitation, general-purpose processors, digital signal processors, field-programmable gate arrays, and complex programmable logic devices. In some embodiments, the gradual increase of an outputted signal based on the second preset may occur while outputting a signal based on the first preset. In certain embodiments, multi-effects unit 100 comprises a buffer memory that stores some or all of the first portion of the guitar signal. A processing component in multi-effects unit 100 may read the stored first portion of the guitar signal in order to process this portion while simultaneously processing the second portion of the guitar signal. The processing component in multi-effects unit 100 may continue to do this until the entire first portion of the guitar signal available in the buffer memory has been read.

If the tail feature is disabled, the processing component in multi-effects unit 100 may end the output of a first thread for processing the first portion of the guitar signal—or a signal derived therefrom—and process the second portion of the guitar signal on a second thread for processing the second portion of the guitar signal (step 335).

Figure 4A:
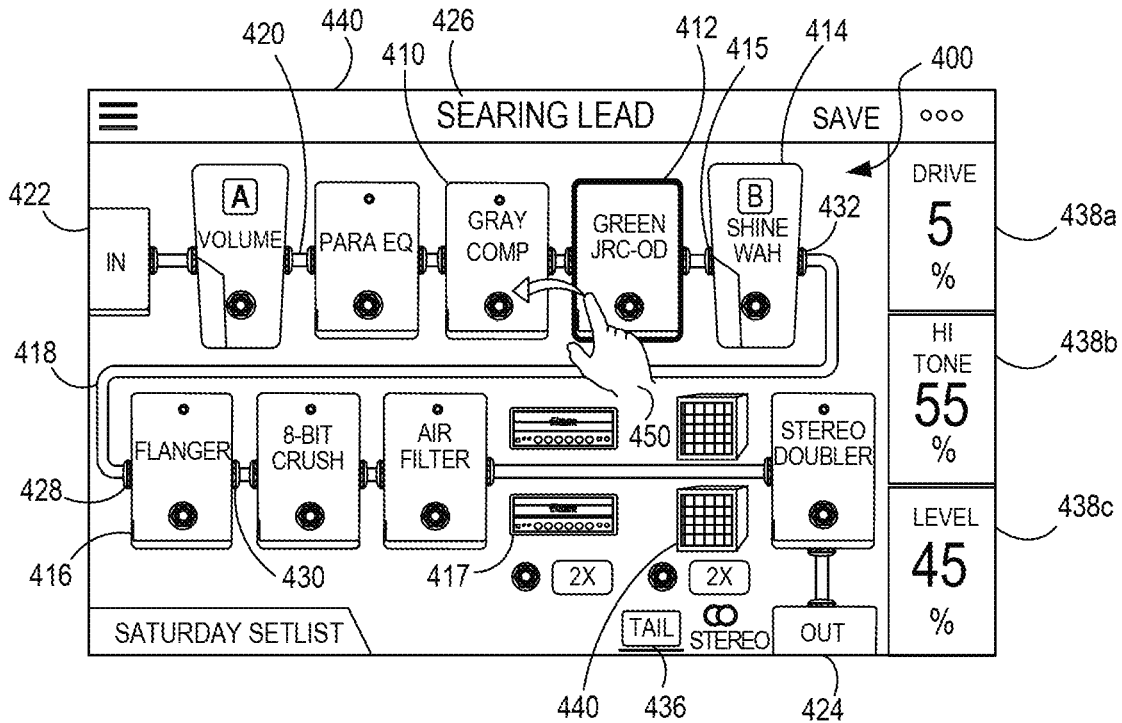
FIGS. 4A and 4B illustrates exemplary displays.
Figure 4B:
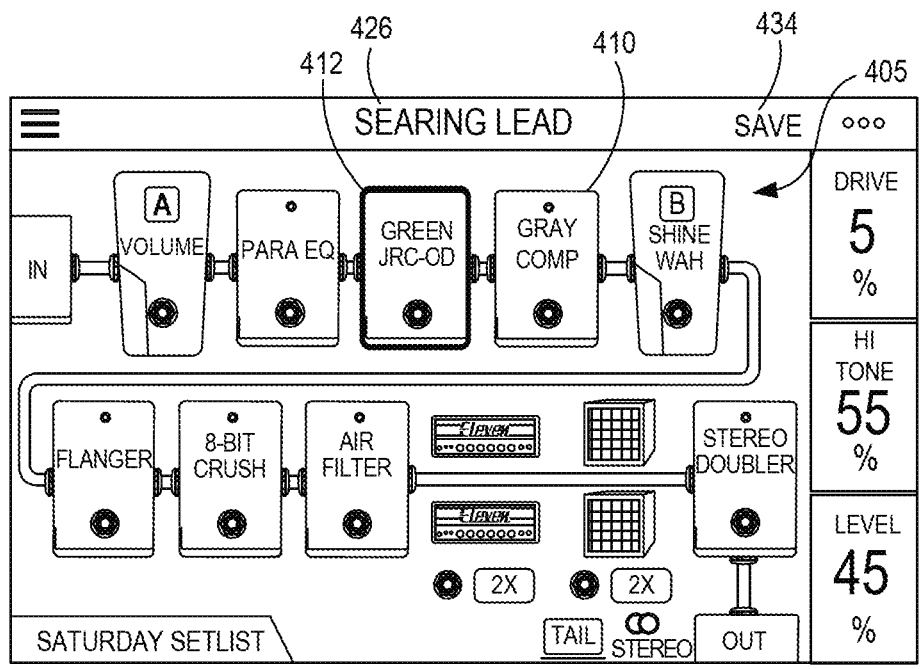

FIGS. 4A and 4B illustrate exemplary displays of signal chains 400 and 405, respectively, on display 1 of multi-effects unit 100. The display of signal chain 400 of FIG. 4A shows multiple discrete guitar-effect pedals (e.g., pedals 410, 412, 414, and 416) and simulated connections (e.g., connections 418 and 420) between connection points (e.g., connection points 432 and 428) on pedals and other components. The discrete guitar-effect pedals or other simulated effect units (e.g., guitar amplifiers or speaker cabinets) with their simulated connections are referred to as a signal chain (e.g., signal chain 400). The image of pedal 410 in signal chain 400 indicates that a guitar effect titled "Gray Comp" may be activated or deactivated by pressing a footswitch 4a, 4b on multi-effects unit 100. Similarly, an image of pedal 412 in signal chain 400 indicates that a guitar effect titled "Green JRC-OD" may be activated or deactivated by pressing a footswitch 4a, 4b on multi-effects unit 100. In some embodiments, a footswitch 4a, 4b on multi-effects unit 100 may be used to activate or deactivate more than one guitar effect pedal. The display of signal chain 400 shows images of guitar amplifier 417 and speaker cabinet 440 to which the signal is routed. The presence of guitar amplifier 438 indicates that the guitar signal is fed to an amplifier-modeling effect, which may be activated by pressing a footswitch 4a, 4b on multi-effects unit 100. The presence of speaker cabinet 440 indicates that the guitar signal is fed to a cabinet-modeling effect, which may be activated by pressing a footswitch 4a, 4b on multi-effects unit 100. Signal chain 400 has in input block 422 and an output block 424. Inputted guitar signals, or signals derived therefrom, travel from input block 422, through a plurality of effect units (e.g., pedals), and into output block 424 via a plurality of simulated connections. Pedals and input block 422 and output block 424 may have an input connection point, such as input connection point 428, and output connection, such as output connection point 430, on pedal 416. Signal is routed, for example, from pedal 414 to pedal 416 by creating a simulated connection 418 between output connection point on 432 on pedal 414 and input connection point 428 on pedal 416. Simulated connection 418 (e.g., a cable) is displayed between output connection point on 432 on pedal 414 and input connection point 428 on pedal 416 to indicate that incoming guitar signal is routed from pedal 414 to pedal 416. Pedals, guitar amplifiers, and speaker cabinets are displayed in different colors and shapes in order to assist a user in quickly discerning which pedals, amplifiers, and cabinets are in a preset's signal chain and what order and arrangement the pedals, amplifiers, and cabinets are connected in. A user may select a pedal to change its color. The titles of the effects, amplifiers, and cabinets displayed thereon may also assist a user in quickly discerning which pedals, amplifiers, and cabinets are in a preset's signal chain and what order and arrangement the pedals, amplifiers, and cabinets are connected in. Effect pedal 414 may be associated with an effect that has a parameter value adjusted by expression pedal 7. For example, if effect pedal 414 is associated with a wah-wah effect, expression pedal 7 may control the peak frequency of this effect. For example, pressing on bottom portion 14a of expression pedal 7 with a user's heal may lower the peak frequency whereas pressing on top portion 14b of expression pedal 7 with a user's toe may raise the peak frequency.

A user may wish to change the order in which pedals in signal chain 400 receive inputted guitar signals. For example, a user may want pedal 412 (Green JRC-OD) to receive inputted guitar signals before pedal 410 (Gray Comp). A user may do so by touching the image of pedal 412 on display 1 and dragging the image of pedal 412 to the position on the signal chain the user wants pedal 412 to occupy (i.e., the position of pedal 410). This position is referred to as the destination position. The user may release their contact with display 1 once the image of pedal 412 has been dragged to the destination position to select the new signal chain arrangement. The resulting signal chain 405, illustrated in FIG. 4B, shows pedal 412 appearing before pedal 410 in signal chain 405. This physical action is illustrated with hand-and-arrow 450 (not actually displayed on display 1).

A user may wish to move the connection point of a connection from one pedal to another. For example, a user may want pedal 412 to feed signal directly into pedal 416 without first going through pedal 414. To do this, a user may select connection point 415 and drag it to connection point 428, thereby creating a simulated connection between pedals 412 and 428 while skipping pedal 414 in the signal chain. Instead or in addition, a user may delete pedal 414 by tapping on it and selecting a delete button (not shown). In some embodiments, a user may drag connection 418 between another pair of pedals to establish a connection between them and delete the connection between pedals 414 and 428.

A signal chain may be specified by a saved preset, which may be recalled at a later time by a user. Preset title 426 is displayed above signal chain 400. A user may display a list of available presets by pressing down substantially near or on the portion of display 1 showing bar 445 and dragging their finger downward on display 1 (i.e., swiping down). When a user selects another preset, display 1 may display another signal chain that is associated with the selected preset and display a different title 426. In the foregoing example of changing the order in which pedals 410 and 412 in signal chain 400 receive the inputted guitar signal, a user may select the save button 434 to save the changes he or she made to the preset with the title displayed at 426.

A user may activate or deactivate the tail feature discussed above with respect to FIG. 3 by selecting tail button 436.

As discussed above, parameters 438a, 438b, and 438c may be displayed next to signal chain 400 and be adjusted with knobs 2a, 2b, and 2c.

Figure 5:
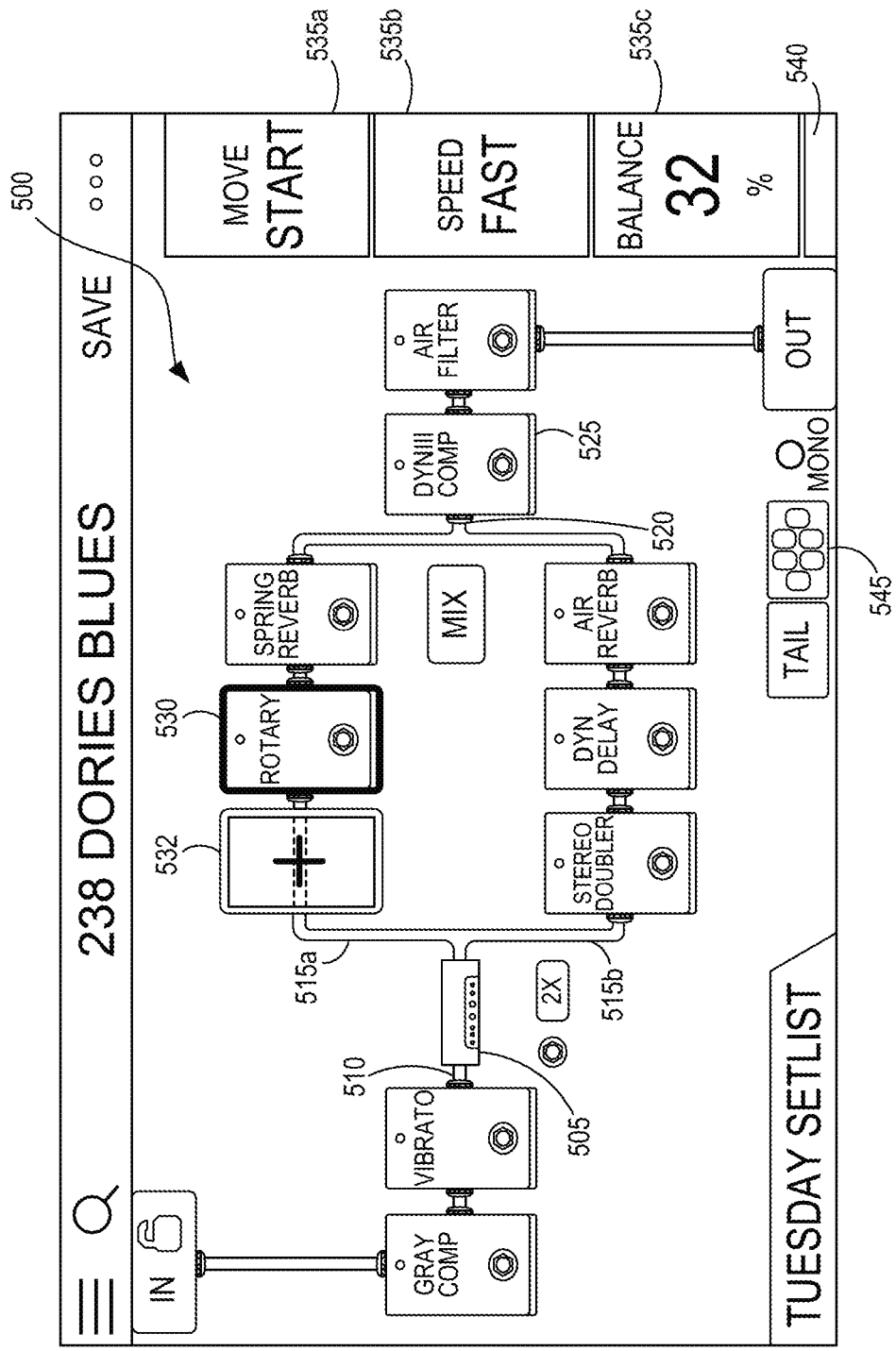
FIG. 5 illustrates another exemplary display.

While signal chain 400 in FIG. 4A has pedals connected in series, a signal chain may have two or more pedals connected in parallel. FIG. 5 illustrates an exemplary signal chain 500. In signal chain 500, an effect unit 505 may receive a single guitar signal input over connection 510 and output two signals that travel in parallel over connections 515a and 515b, respectively. The two signals may be combined (e.g., mixed) into a single signal at connection point 520 and the mixed signal fed to effect pedal 525. A user may select button 545 to select whether the signal will begin and end as a series connection of pedals; begin as a series connection, split into a parallel connection, and end as a single connection; or begin with a split of two signals that are later joined into a single connection. The illustration on button 545 may be used to visually indicate which of these modes is selected.

If there is an empty slot in signal chain 500 into which an effect unit may be placed, an empty position 532 with a plus sign, no sign, and/or another sign may be displayed.

To adjust parameters of pedal 530, a user may select pedal 530 by, for example, tapping on the portion of display 1 showing pedal 530. When selected, pedal 530 may have a highlight displayed around it. Parameters pertaining to pedal 530, such as a first set of parameters 535a, 535b, and 535c, are displayed when pedal 530 is selected. The displayed parameters may be adjusted by knobs 2a, 2b, and 2c, as discussed with respect to FIG. 1. If there are more parameters than the number of knobs with which to adjust them, display 1 may show the top portion 540 of another set of parameters. The other set of parameters can be selected for display and adjustment by knobs 2a, 2b, and 2c by tapping on the portion display 1 showing the first set of parameters 535a, 535b, and 535c. In some embodiments, a user may assign which parameter a knob will control.

Figure 6:
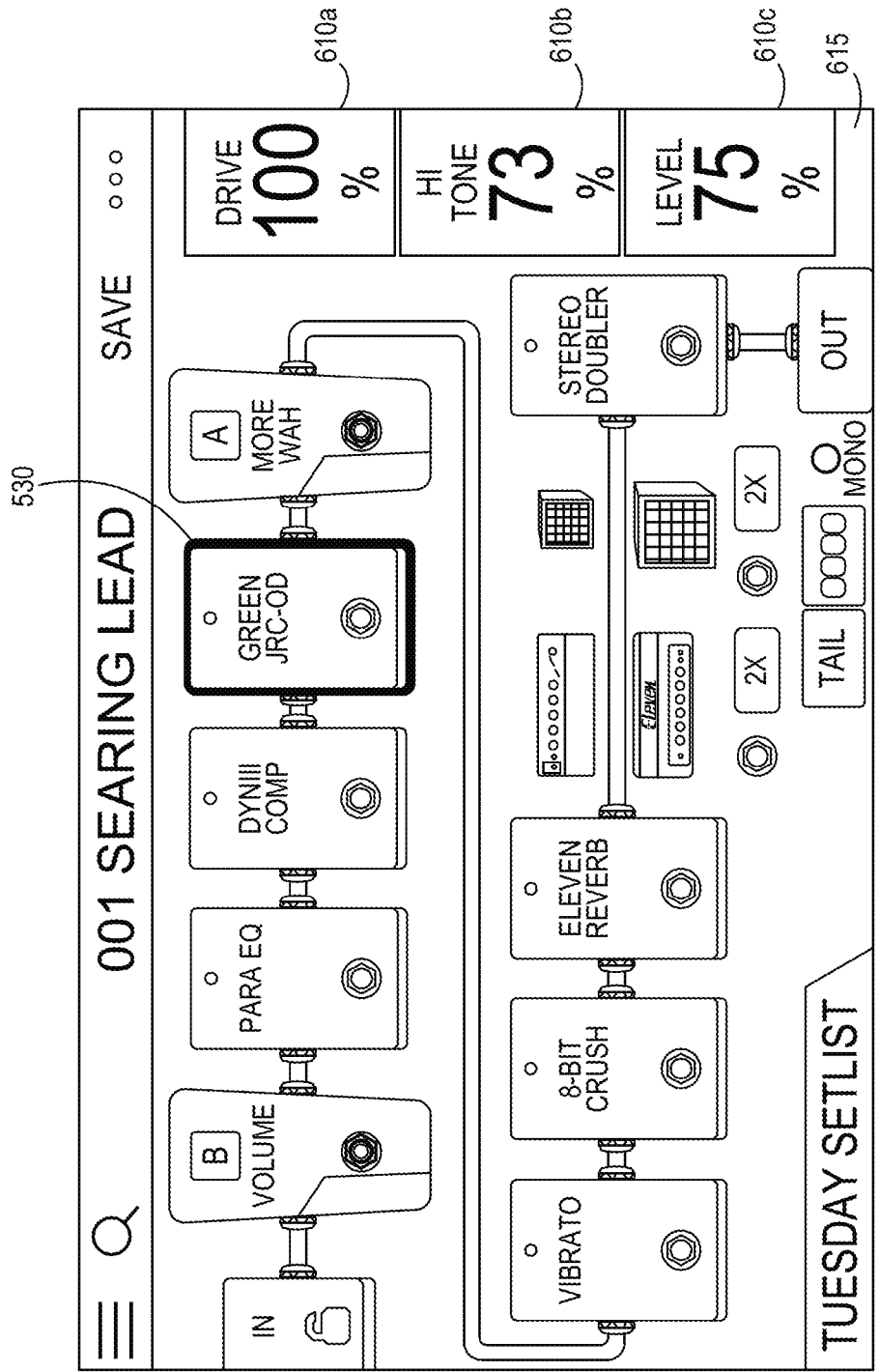
FIG. 6 illustrates another exemplary display.

Not all effect pedals have more adjustable parameters than there are knobs with which to make the adjustments. For example, effect pedal 530 of FIG. 6 has only three parameters that may be adjusted: 610a, 610b, and 610c. In this case, the area 615 below 610c does not have a portion of another parameter set displayed, indicating that there are no other parameters that may be adjusted with knobs 2a, 2b, and 2c on pedal 530.

Certain embodiments of the present disclosure may be implemented as software on a general-purpose computer or on another device.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

The features and advantages of the disclosure are apparent from the detailed specification, and, thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and, accordingly, all suitable modifications and equivalents falling within the scope of the disclosure may be resorted to.

Computer programs, program modules, and code based on the written description of this specification, such as those used by the microcontrollers, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

Another aspect of the disclosure is directed to a non-transitory computer-readable medium storing instructions which, when executed, cause one or more processors to perform the methods of the disclosure. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

Moreover, while illustrative embodiments have been described herein, the scope of any and all embodiments include equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A multi-effects apparatus, comprising:
   one or more switches;
   an electronic display:
   a memory storing one or more effect presets for processing an inputted audio signal by changing a status of at least one of the switches, wherein each effect preset defines one or more signal processing chains and is initiated by a switch of the one or more switches;
   one or more processors coupled to the electronic display and the memory, the one or more processors configured to:
      process the inputted audio signal when the processing is initiated by at least one of the one or more switches by:
         processing a first portion of the inputted audio signal based on parameters of a first preset of the one or more effect presets, when a switch associated with the first preset is selected;
         simultaneously processing a second portion of the inputted audio signal based on parameters of a second preset of the one or more effect presets, when a switch associated with the second preset is selected; and
         outputting both the processed first portion and the processed second portion simultaneously;
      display, when the processing is initiated, on the electronic display:
         an image of at least one of the signal processing chains, wherein the image of the at least one of the signal processing chains comprises visual representations of one or more audio effects in the at least one of the signal processing chains and any connections therebetween.

2. The apparatus of claim 1, wherein a visual representation of the one or more audio effects in the at least one of the signal processing chains contains sufficient detail to visually discern at least one audio effect from other audio effects in the image.

3. The apparatus of claim 1, wherein the electronic display is a touchscreen display.

4. The apparatus of claim 3, wherein signal routing designations between multiple audio effects in the at least one of the signal processing chains are made through the touchscreen display.

5. The apparatus of claim 4, wherein signal routing designations between multiple audio effects in the at least one of the signal processing chains is made through the touchscreen display by dragging a visual representation of an audio effect from an initial position in the at least one of the signal processing chains to a destination position in the at least one of the signal processing chains.

6. The apparatus of claim 3, wherein signal routing in the at least one of the signal processing chains is changed by touching a display of at least one image of a connection point on the touchscreen display.

7. The apparatus of claim 6, wherein signal routing in the at least one of the signal processing chains is changed by creating a simulated connection between a simulated starting connection point and a simulated destination connection point by touching a display of an image of the simulated starting connection point and by touching a display of an image of the simulated destination connection point on the touchscreen display.

8. The apparatus of claim 7, wherein the touching of the display of the image of the simulated starting connection point and the touching of the display of the image of the simulated destination connection point is a continuous touch of the touchscreen display.

9. A non-transitory computer-readable medium storing instructions executable by at least one processor to facilitate displaying a user interface on a multi-effects apparatus according to a method, the method comprising:
  storing one or more effect presets for processing an inputted audio signal, wherein each effect preset defines one or more signal processing chains and is initiated by a switch of one or more switches;
  processing an inputted audio signal when the processing is initiated by at least one of the switches by:
    processing a first portion of the inputted audio signal based on parameters of a first preset of the one or more effect presets, when a switch associated with the first preset is selected;
    simultaneously processing a second portion of the inputted audio signal based on parameters of a second preset of the one or more effect presets, when a switch associated with the second preset is selected; and
    outputting both the processed first portion and the processed second portion simultaneously;
  displaying, when the processing is initiated, on an electronic display: an image of at least one signal processing chain associated with the at least one of the switches, wherein the image of the at least one signal processing chain comprises visual representations of one or more audio effects in the at least one signal processing chain and any connections therebetween.

10. The non-transitory computer-readable medium of claim 9, wherein a visual representation of the one or more audio effects in the at least one signal processing chain contains sufficient detail to visually discern at least one audio effect from other audio effects in the image.

11. The non-transitory computer-readable medium of claim 9, wherein the electronic display a touchscreen display.

12. The non-transitory computer-readable medium of claim 11, wherein signal routing designations between multiple audio effects in the at least one signal processing chain is made through the touchscreen display.

13. The non-transitory computer-readable medium of claim 12, wherein signal routing designations between multiple audio effects in the at least one signal processing chain is made through the touchscreen display by dragging a visual representation of an audio effect from an initial position in the at least one signal processing chain to a destination position in the at least one signal processing chain.

14. The non-transitory computer-readable medium of claim 11, wherein signal routing in the at least one signal processing chain is changed by touching a display of at least one image a connection point on the touchscreen display.

15. The non-transitory computer-readable medium of claim 11, wherein signal routing in the at least one signal processing chain is changed by creating a simulated connection between a simulated starting connection point and a simulated destination connection point by touching a display of an image of the simulated starting connection point and by touching a display of an image of the simulated destination connection point on the touchscreen display.

16. The non-transitory computer-readable medium of claim 15, wherein the touching of the display of the image of the simulated starting connection point and the touching of the display of the image of the simulated destination connection point is a continuous touch of the touchscreen display.

17. A system comprising a processor and a non-transitory computer-readable storage medium storing instruction that, when executed by the processor, cause the processor to display a user interface on a guitar multi-effects pedalboard according to a method, the method comprising:
  storing one or more effect presets for processing an inputted audio signal, wherein each effect preset defines one or more signal processing chains and is initiated by a footswitch of one or more footswitches;
  processing an inputted guitar signal when the processing is initiated through at least one of one or more footswitches by:
    processing a first portion of the inputted audio signal based on parameters of a first preset of the one or more effect presets, when a footswitch associated with the first preset is selected;
    simultaneously processing a second portion of the inputted audio signal based on parameters of a second preset of the one or more effect presets, when a footswitch associated with the second preset is selected; and
    outputting both the processed first portion and the processed second portion simultaneously;
  displaying, when the processing is initiated, on an electronic display:
    an image of at least one signal processing chain, wherein the image of the at least one signal processing chain comprises visual representations of one or more audio effects in the at least one signal processing chain and any connections therebetween.

18. The system of claim 17, wherein a visual representation of the one or more audio effects in the at least one signal processing chain contains sufficient detail to visually discern at least one audio effect from other audio effects in the image.

19. The system of claim 17, wherein the electronic display is a touchscreen display and wherein signal routing designations between multiple audio effects in the at least one signal processing chain are made through the touchscreen display by dragging a visual representation of an audio effect from an initial position in the at least one signal processing chain to a destination position in the at least one signal processing chain.

20. The system of claim 17, wherein the electronic display is a touchscreen display and wherein signal routing in the at least one signal processing chain is changed by touching a visual representation of a simulated starting connection point and touching a visual representation of a simulated destination connection point.

\* \* \* \* \*